(12) United States Patent
Daute et al.

(10) Patent No.: US 9,631,098 B2
(45) Date of Patent: Apr. 25, 2017

(54) DISPERSING AGENT COMPRISING FILLERS OR PIGMENTS

(75) Inventors: Peter Daute, Beverstedt (DE); Konstantin Nikusev, Vienna (AT); Sascha Simon, Bremerhaven (DE)

(73) Assignee: Amril AG, Zug (CH)

( * ) Notice: Subject to any disclaimer, the term of this patent is extended or adjusted under 35 U.S.C. 154(b) by 108 days.

(21) Appl. No.: 14/407,501

(22) PCT Filed: Jul. 11, 2012

(86) PCT No.: PCT/EP2012/063527
§ 371 (c)(1),
(2), (4) Date: Mar. 30, 2015

(87) PCT Pub. No.: WO2013/185849
PCT Pub. Date: Dec. 19, 2013

(65) Prior Publication Data
US 2015/0232669 A1    Aug. 20, 2015

(30) Foreign Application Priority Data

Jun. 13, 2012   (EP) .................... 12171888

(51) Int. Cl.
C09C 3/00 (2006.01)
C09C 3/08 (2006.01)
C09C 1/02 (2006.01)
C08K 9/04 (2006.01)

(52) U.S. Cl.
CPC .............. C09C 3/08 (2013.01); C08K 9/04 (2013.01); C09C 1/021 (2013.01); C01P 2004/12 (2013.01); C01P 2004/20 (2013.01); C01P 2004/32 (2013.01); C01P 2004/38 (2013.01); C01P 2004/61 (2013.01)

(58) Field of Classification Search
CPC .. C09C 3/08; C09C 1/021; C09K 9/04; C01P 2004/12; C01P 2004/20; C01P 2004/32; C01P 2004/38; C01P 2004/61
See application file for complete search history.

(56) References Cited

U.S. PATENT DOCUMENTS

| | | |
|---|---|---|
| 7,488,838 B2 | 2/2009 | Daute et al. |
| 8,168,571 B2 | 5/2012 | Daute |
| 8,796,355 B2 | 8/2014 | Daute |
| 8,901,221 B2 | 12/2014 | Daute |
| 2010/0324186 A1* | 12/2010 | Birmingham et al. .. C08K 9/02 524/262 |
| 2011/0124785 A1 | 5/2011 | Daute et al. |
| 2012/0190883 A1 | 7/2012 | Frey et al. |
| 2013/0131247 A1 | 5/2013 | Daute et al. |
| 2013/0310478 A1 | 11/2013 | Daute et al. |

FOREIGN PATENT DOCUMENTS

WO        2010134087 A1   11/2010

OTHER PUBLICATIONS

Daute, U.S. Appl. No. 14/358,985, filed Sep. 12, 2014.
International Search Report mailed on Aug. 9, 2013 in PCT/EP2012/063527 (4 pages).
Written Opinion mailed on Aug. 9, 2013 in PCT/EP2012/063527 (5 pages).

* cited by examiner

*Primary Examiner* — Nathan M Nutter
(74) *Attorney, Agent, or Firm* — Philip P. McCann; Smith Moore Leatherwood LLP

(57) ABSTRACT

The present invention relates to ester-coated core particles, thermoplastic polymer composition comprising a thermoplastic polymer and such coated particles, a method for producing ester coated particles and the use of compositions of the invention as fillers or pigments with improved dispersion properties and pourability.

17 Claims, No Drawings

1

DISPERSING AGENT COMPRISING FILLERS OR PIGMENTS

This application is a national stage application under 35 U.S.C. §371 of International Application No. PCT/EP2012/063527 filed 11 Jul. 2012, which claims priority to European Application No. EP 12171888.6 filed 13 Jun. 2012, the disclosures of which are expressly incorporated herein by reference.

The present invention relates to ester-coated core particles, thermoplastic polymer composition comprising a thermoplastic polymer and such coated particles, a method for producing ester coated particles and the use of compositions of the invention as fillers or pigments with improved dispersion properties and pourability.

BACKGROUND OF THE INVENTION

Particulates may be used as filler additives to polymer compositions such as thermoplastic polymer compositions. Filled polymers are widely used in many fields of application. Adding fillers provides the advantage that the physical properties of the polymer material can be optimized, e.g. to increase the stiffness and toughness and to modify heat conductivity or heat deflection temperature (HDT) of the composite material. Additional benefits of filler-modified polymers are their versatility and an exceptional price/volume performance ratio. For example, the price of the polymer composite usually decreases with increasing filler content.

Filler comprising polymer materials are used in various fields such as automotive, furniture, electrical appliances and other fields.

However, small particles such as fillers tend to form aggregates, which deteriorate the properties of the polymer composite material. In some resins, at a specific bulk density, the aggregation tendency of fillers and in particular spherical fillers generally becomes significant and problematic. At the same time their aggregation tendency makes handling and confectioning of fillers difficult. For example, pneumatic conveying of fillers may be inefficient.

Thus, there is a need for improved filler materials which exhibit reduced aggregation tendency and improved dispersion qualities. The same problems and needs apply to pigments for polymers. The handling and dispersion of such pigments, e.g. inorganic or organic pigments in plastics frequently still presents difficulties. In particular it is desirable to provide improved pigments which do not compact during extrusion, have the same color tone as the non-modified pigments and which show little or no flocculation and no loss of gloss.

SUMMARY OF THE INVENTION

Thus, it was one object of the invention to overcome the above outlined problems. In particular it was an object of the invention to provide improved fillers and pigments with reduced flocculation tendency whereby the rheological properties such as viscosity of a polymer comprising said improved fillers and pigments is not significantly altered.

The modified pigment and filler particles of the invention will disperse well in most types of polymers. Furthermore, they were easier to handle and to confection than prior art pigments and fillers.

The present invention provides in a first aspect a composition comprising the following components:
(a) a core particle; and
(b) a coating that at least partially surrounds said core particle and that comprises an optionally substituted ester of a polyol and a saturated or unsaturated monocarboxylic acid; wherein said core particle and said coating are not the same material.

Also provided is a thermoplastic polymer composition comprising a thermoplastic polymer and a composition according to the invention.

The invention further provides a method for producing a composition according to the invention comprising the steps:
(i) providing a core particle as defined in any embodiments of the invention;
(ii) providing said optionally substituted ester as defined herein in liquid form;
(iii) coating said core particle with said optionally substituted ester by mixing the ester with said core particle; and
(iv) optionally solidifying said ester coating by drying and/or cooling.

A further aspect of the invention relates to the use of a composition according to the invention as filler or pigment in a thermoplastic polymer, wherein the thermoplastic polymer is preferably one as defined herein.

DETAILED DESCRIPTION OF THE INVENTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Some documents are cited throughout the text of this specification. Each of the documents cited herein (including all patents, patent applications, scientific publications, manufacturer's specifications, instructions, DIN norms etc.), whether supra or infra, are hereby incorporated by reference in their entirety. Nothing herein is to be construed as an admission that the invention is not entitled to antedate such disclosure by virtue of prior invention.

In the following definitions of the chemical terms: "alkyl", "heteroalkyl", "cycloalkyl", "heterocycloalkyl", "alicyclic system", "aryl", "aralkyl", "heteroaryl", "heteroaralkyl", "alkenyl", "cycloalkenyl", "alkynyl" and "optionally substituted" are provided. These terms will in each instance of its use in the remainder of the specification have the respectively defined meaning and preferred meanings.

The term "alkyl" refers to a saturated straight or branched carbon chain. Preferably, an alkyl as used herein is a $C_1$-$C_{36}$ alkyl or $C_1$-$C_{20}$ alkyl and more preferably is a $C_1$-$C_{10}$ alkyl, i.e. having 1, 2, 3, 4, 5, 6, 7, 8, 9 or 10 carbon atoms, e.g. is selected from methyl, ethyl, propyl, iso-propyl, butyl, iso-butyl, tert-butyl, pentyl or hexyl, heptyl, octyl, nonyl and decyl. Alkyl groups are optionally substituted.

The term "alcohol" refers to a compound having one or more hydroxyl groups. For example a $C_8$-$C_{36}$ alkyl alcohol is a $C_8$-$C_{36}$ alkyl substituted with one or more hydroxyl groups and preferably with one or two hydroxyl groups.

The term "heteroalkyl" refers to a saturated straight or branched carbon chain. Preferably, the chain comprises from 1 to 9 carbon atoms, i.e. 1, 2, 3, 4, 5, 6, 7, 8, 9 e.g. methyl, ethyl, propyl, iso-propyl, butyl, iso-butyl, sec-butyl, tert-butyl, pentyl or hexyl, heptyl, octyl, which is interrupted one or more times, e.g. 1, 2, 3, 4, 5, with the same or different heteroatoms. Preferably the heteroatoms are selected from O, S, and N, e.g. —O—$CH_3$, —S—$CH_3$, —$CH_2$—O—$CH_3$, —$CH_2$—O—$C_2H_5$, —$CH_2$—S—$CH_3$, —$CH_2$—S—$C_2H_5$, —$C_2H_4$—O—$CH_3$, —$C_2H_4$—O—$C_2H_5$, —$C_2$—$H_4$—S—$CH_3$, —$C_2$—$H_4$—S—$C_2H_5$ etc. Heteroalkyl groups are optionally substituted.

The terms "cycloalkyl" and "heterocycloalkyl", by themselves or in combination with other terms, represent, unless otherwise stated, cyclic versions of "alkyl" and "heteroalkyl", respectively, with preferably 3, 4, 5, 6, 7, 8, 9 or 10 atoms forming a ring, e.g. cyclopropyl, cyclobutyl, cyclopentyl, cyclohexyl, cycloheptyl, cyclooctyl etc. The terms "cycloalkyl" and "heterocycloalkyl" are also meant to include bicyclic, tricyclic and polycyclic versions thereof. If more than one cyclic ring is present such as in bicyclic, tricyclic and polycyclic versions, then these rings may also comprise one or more aryl- or heteroaryl ring. The term "heterocycloalkyl" preferably refers to a saturated ring having five members of which at least one member is a N, O or S atom and which optionally contains one additional O or one additional N; a saturated ring having six members of which at least one member is a N, O or S atom and which optionally contains one additional O or one additional N or two additional N atoms; or a saturated bicyclic ring having nine or ten members of which at least one member is a N, O or S atom and which optionally contains one, two or three additional N atoms. "Cycloalkyl" and "heterocycloalkyl" groups are optionally substituted. Additionally, for heterocycloalkyl, a heteroatom can occupy the position at which the heterocycle is attached to the remainder of the molecule. Preferred examples of cycloalkyl include cyclopropyl, cyclobutyl, cyclopentyl, cyclohexyl, cycloheptyl, cyclooctyl, cyclononyl, cyclodecyl, spiro[3,3]heptyl, spiro[3,4]octyl, spiro[4,3]octyl, spiro[3,5]nonyl, spiro[5,3]nonyl, piro[3,6]decyl, spire[6,3]decyl, spire[4,5]decyl, spiro[5,4]decyl, bicyclo[4.1.0]heptyl, bicyclo[3.2.0]heptyl, bicyclo[2.2.1]heptyl, bicyclo[2.2.2]octyl, bicyclo[5.1.0]octyl, bicyclo[4.2.0]octyl, octahydro-pentalenyl, octahydro-indenyl, decahydro-azulenyl, adamantly, or decahydro-naphthalenyl. Examples of heterocycloalkyl include 1-(1,2,5,6-tetrahydropyridyl), 1-piperidinyl, 2-piperidinyl, 3-piperidinyl, 4-morpholinyl, 3-morpholinyl, 1,8 diaza-spiro-[4,5]decyl, 1,7 diaza-spiro-[4,5]decyl, 1,6 diaza-spiro-[4,5]decyl, 2,8 diaza-spiro[4,5]decyl, 2,7 diaza-spiro[4,5]decyl, 2,6 diaza-spiro[4,5]decyl, 1,8 diaza-spiro-[5,4]decyl, 1, 7 diaza-spiro-[5,4] decyl, 2,8 diaza-spiro-[5,4]decyl, 2,7 diaza-spiro[S,4]decyl, 3,8 diaza-spiro[5,4]decyl, 3,7 diaza-spiro[5,4]decyl, 1-aza-7,11-dioxo-spiro[5,5]undecyl, 1,4-diazabicyclo[2.2.2]oct-2-yl, tetrahydrofuran-2-yl, tetrahydrofuran-3-yl, tetrahydrothien-2-yl, tetrahydrothien-3-yl, 1-piperazinyl, 2-piperazinyl, and the like.

The term "alicyclic system" refers to mono, bi cyclic, tricyclic or polycyclic version of a cycloalkyl or heterocycloalkyl comprising at least one double and/or triple bond. However, an alicyclic system is not aromatic or heteroaromatic, i.e. does not have a system of conjugated double bonds/free electron pairs. Thus, the number of double and/or triple bonds maximally allowed in an alicyclic system is determined by the number of ring atoms, e.g. in a ring system with up to 5 ring atoms an alicyclic system comprises up to one double bond, in a ring system with 6 ring atoms the alicyclic system comprises up to two double bonds. Thus, the "cycloalkenyl" as defined below is a preferred embodiment of an alicyclic ring system. Alicyclic systems are optionally substituted.

The term "aryl" preferably refers to an aromatic monocyclic ring containing 6 carbon atoms, an aromatic bicyclic ring system containing 10 carbon atoms or an aromatic tricyclic ring system containing 14 carbon atoms. Examples are phenyl, naphtyl or anthracenyl. The aryl group is optionally substituted.

The term "aralkyl" refers to an alkyl moiety, which is substituted by aryl, wherein alkyl and aryl have the meaning as outlined above. An example is the benzyl radical. Preferably, in this context the alkyl chain comprises from 1 to 8 carbon atoms, i.e. 1, 2, 3, 4, 5, 6, 7, or 8, e.g. methyl, ethyl methyl, ethyl, propyl, isa-propyl, butyl, iso-butyl, sec-butenyl, tert-butyl, pentyl or hexyl, pentyl, octyl. The aralkyl group is optionally substituted at the alkyl and/or aryl part of the group.

The term "heteroaryl" preferably refers to a five or six-membered aromatic monocyclic ring wherein at least one of the carbon atoms are replaced by 1, 2, 3, or 4 (for the five membered ring) or 1, 2, 3, 4, or 5 (for the six membered ring) of the same or different heteroatoms, preferably selected from O, N and S; an aromatic bicyclic ring system wherein 1, 2, 3, 4, 5, or 6 carbon atoms of the 8, 9, 10, 11 or 12 carbon atoms have been replaced with the same or different heteroatoms, preferably selected from O, N and S; or an aromatic tricyclic ring system wherein 1, 2, 3, 4, 5, or 6 carbon atoms of the 13, 14, 15, or 16 carbon atoms have been replaced with the same or different heteroatoms, preferably selected from O, N and S. Examples are oxazolyl, isoxazolyl, 1,2,5-oxadiazolyl, 1,2,3-oxadiazolyl, pyrrolyl, imidazolyl, pyrazolyl, 1,2,3-triazolyl, thiazolyl, isothiazolyl, 1,2,3,-thiadiazolyl, 1,2,5-thiadiazolyl, pyridinyl, pyrimidinyl, pyrazinyl, 1,2,3-triazinyl, 1,2,4-triazinyl, 1,3,5-triazinyl, 1-benzofuranyl, 2-benzofuranyl, indolyl, isoindolyl, benzothiophenyl, 2-benzothiophenyl, 1H-indazolyl, benzimidazolyl, benzoxazolyl, indoxazinyl, 2,1-benzisoxazoyl, benzothiazolyl, 1,2-benzisothiazolyl, 2,1-benzisothiazolyl, benzotriazolyl, quinolinyl, isoquinolinyl, quinoxalinyl, quinazolinyl, 1,2,3-benzotriazinyl, or 1,2,4-benzotriazinyl.

The term "heteroaralkyl" refers to an alkyl moiety, which is substituted by heteroaryl, wherein alkyl and heteroaryl have the meaning as outlined above. An example is the 2-alklypyridinyl, 3-alkylpyridinyl, or 2-methylpyridinyl. Preferably, in this context the alkyl chain comprises from 1 to 8 carbon atoms, i.e. 1, 2, 3, 4, 5, 6, 7, or 8, e.g. methyl, ethyl methyl, ethyl, propyl, iso-propyl, butyl, iso-butyl, sec-butenyl, tert-butyl, pentyl or hexyl, pentyl, octyl. The heteroaralkyl group is optionally substituted at the alkyl and/or heteroaryl part of the group.

The terms "alkenyl" and "cycloalkenyl" refer to olefinic unsaturated carbon atoms containing chains or rings with one or more double bonds. Examples are propenyl and cyclohexenyl.

Preferably, the alkenyl chain comprises from 2 to 8 carbon atoms, i.e. 2, 3, 4, 5, 6, 7, or 8, e.g. ethenyl, 1-propenyl, 2-propenyl, iso-propenyl, 1-butenyl, 2-butenyl, 3-butenyl, iso-butenyl, sec-butenyl, 1-pentenyl, 2-pentenyl, 3-pentenyl, 4-pentenyl, hexenyl, heptenyl, octenyl. The term also comprises CH2, i.e. methenyl, if the substituent is directly bonded via the double bond. Preferably the cycloalkenyl ring comprises from 3 to 14 carbon atoms, i.e. 3, 4, 5, 6, 7, 8, 9, 10, 11, 12, 13 or 14, e.g. cyclopropenyl, cyclobutenyl, cyclopentenyl, cyclohexenyl, cycloheptenyl, cyclooctyl, cyclononenyl, cyclodecenyl, spiro[3,3]heptenyl, spiro[3,4]octenyl, spiro[4,3]octenyl, spiro[3,5]nonenyl, spiro[5,3]nonenyl, spiro[3,6]decenyl, spiro[6,3]decenyl, spiro[4,5]decenyl, spiro[5,4]decenyl, bicyclo[4.1.0]heptenyl, bicyclo[3.2.0]heptenyl, bicyclo[2.2.1]heptenyl, bicyclo[2.2.2]octenyl, bicyclo[5.1.0]octenyl, bicyclo[4.2.0]octenyl, hexahydro-pentalenyl, hexahydro-indenyl, octahydro-azulenyl, or octahydro-naphthalenyl.

The term "alkynyl" refers to unsaturated carbon atoms containing chains or rings with one or more triple bonds. An example is the propargyl radical. Preferably, the alkynyl chain comprises from 2 to 8 carbon atoms, i.e. 2, 3, 4, 5, 6, 7, or 8, e.g. ethynyl, 1-propynyl, 2-propynyl, 1-butyryl, 2-butyryl, 3-butyryl, 1-pentynyl, 2-pentynyl, 3-pentynyl, 4-pentynyl, hexynyl, pentynyl, octynyl.

The term "optionally substituted" in each instance if not further specified refers to between 1 and 10 substituents, e.g. 1, 2, 3, 4, 5, 6, 7, 8, 9, or 10 substituents which are in each instance independently selected from the group consisting of halogen, in particular F, Cl, Br or I; —NO$_2$, —CN, —OR''', —NR'R'', —(CO)OR', —(CO)OR''', —(CO)NR'R'', —NR-'COR'''', —NR'COR', —NR''CONR'R'', —NR''SO$_2$R', —COR'''; —S02NR'R'', —OOCR''' and -E;

R' and R'' is each independently selected from the group consisting of hydrogen, alkyl, alkenyl, alkynyl, —OE, cycloalkyl, heterocycloalkyl, aryl, heteroaryl, and aralkyl or together form a heteroaryl, or heterocycloalkyl; optionally substituted;

R''' and R'''' is each independently selected from the group consisting of alkyl, alkenyl, alkynyl, cycloalkyl, heterocycloalkyl, alkoxy, aryl, aralkyl, heteroaryl, and —NR'R'';

E is selected from the group consisting of alkyl, alkenyl, cycloalkyl, alkoxy, alkoxyalkyl, heterocycloalkyl, an alicyclic system, aryl and heteroaryl; optionally substituted;

If two or more radicals can be selected independently from each other, then the term "independently" means that the radicals may be the same or may be different.

As used herein the term "full ester" means that during ester synthesis preferably all free hydroxyl groups of the alcohol reactant are reacted with a carboxylic acid such that there are no free hydroxyl groups on the alcohol part of the full ester.

As used herein "partial ester" comprises at least one, two, three, four, five, six or more free hydroxyl groups.

The ester used in the compositions of the invention may preferably have a hydroxyl number of between 50 and 350, in particular 50 to 300. In another embodiment, the ester may have preferably a hydroxyl number of below 50, in particular below 30 and most preferably 0. The esters with these hydroxyl numbers may be one specific ester or mixtures of esters.

The hydroxyl number of esters can be determined using the method according DIN 53240-2.

The present invention provides improved modified fillers and pigments for polymer compositions, preferably for thermoplastic polymer compositions, in particular for thermoplastic polymers such as halogenated polyolefins and in particular for polyvinyl chloride. It is preferable that the novel filler and pigment compositions according to the invention do not aggregate or flocculate such that they can effectively be handled and confectioned more easily and disperse well in polymer compositions.

It was unexpectedly found that core particles which can be fillers or pigment particles can be modified by coating them with non-polymeric esters. Such coated core particles are easier to disperse in polymers and have an overall reduced tendency to flocculate or sediment.

Thus, in a first aspect the invention provides a composition comprising the following components:

(a) a core particle; and
(b) a coating that at least partially surrounds and preferably fully surrounds said core particle and that comprises an optionally substituted ester of a polyol and a saturated or unsaturated monocarboxylic acid;

wherein said core particle and said coating are not the same material.

In a preferred embodiment the core particle is a filler or a pigment. The core particle in the composition of the invention can have any shape and can be for example filamentous, spherical, cylindrical, cubic, platy, acicular, discoidal, tabular, ellipsoidal, equant or irregular.

The core particle is particulate and may be hollow, porous or solid and is preferably solid. Since the core particle is particulate it preferably has an average particle size $d_{50}$ of between 1 and 500 µm. However, it is preferred that that the maximum average particle size is 100 µm or less and/or that the minimum average particle size is 3 µm.

In one preferred embodiment the core particle is at least partially crystalline.

If the core particle is a filler, then the filler is preferably a compound selected from the list consisting of calcium carbonate, dolomite, kaolinite, carbon, zeolite, graphite, mica, borosilicate, silicon dioxide, cellulose, silicic acid, aluminium hydroxide, magnesium hydroxide, magnesium oxide, zinc oxide and calcium oxide, chalk, kaolin, quartz powder, baryte, a metal powder, hydrated alumina, cement, talc, diatomaceous earth, sawdust, wood chips and a mixture of at least two of these fillers.

If the core particle is a pigment, the pigment is preferably a pigment selected from the list consisting of a cadmium pigment, a carbon pigment, a chromium pigment, a cobalt pigment, a copper pigment, an iron oxide pigment, a clay earth pigment, a lead pigment, a mercury pigment, a titanium pigment, an ultramarine pigment, a zinc pigment, an organic pigment, a biological pigment and mixtures thereof.

Particularly preferred is a pigment selected from the group consisting of lead sulphate, Phthalocyanine Blue, Perylene Red, Pyrazolone Yellow, Chromium-azo complex Red, Isoindolinone Yellow, Anthraquinone Red, titanium dioxide, zinc sulphide, iron (III) oxide, chromium (III) oxide, cobalt Blue, Ultramarine, lead chromate, carbon black, cadmium-yellow and a mixture of at least two of these pigments.

As mentioned, the optionally substituted ester in the composition of the invention is made of a polyol and a saturated or unsaturated monocarboxylic acid.

Preferably, the optionally substituted ester in the composition of the invention is preferably based on a monocarboxylic acid selected from the group consisting of
a branched saturated $C_8$-$C_{36}$ monocarboxylic acid,
an unbranched saturated $C_8$-$C_{36}$ monocarboxylic acid,
a branched unsaturated $C_8$-$C_{36}$ monocarboxylic acid and
an unbranched unsaturated $C_8$-$C_{36}$ monocarboxylic acid.

As monocarboxylic acids in (b) of the composition of the invention unbranched monocarboxylic acids are preferred, in particular $C_8$-$C_{22}$ monocarboxylic acids which most preferably have an even number of carbon atoms.

In a further preferred embodiment of the composition of the invention the monocarboxylic acid in (b) is an unbranched $C_{12}$-$C_{22}$ monocarboxylic acid such as lauric acid, myristic acid, palmitic acid, stearic acid, oleic acid, linoleic acid or linolenic acid.

In one embodiment the composition of the invention comprises
  (a) a pigment as core particle; and
  (b) as coating that at least partially surrounds said core particle an optionally substituted ester of a polyol and a saturated or unsaturated monocarboxylic acid;
wherein said core particle and said coating are not the same material and wherein said monocarboxylic acid in (b) is an unbranched $C_{12}$-$C_{22}$ monocarboxylic acid such as lauric acid, myristic acid, palmitic acid, stearic acid, oleic acid, linoleic acid or linolenic acid.

In a further embodiment the composition of the invention comprises
  (a) a filler as core particle; and
  (b) as coating that at least partially surrounds said core particle an optionally substituted ester of a polyol and a saturated or unsaturated monocarboxylic acid;
wherein said core particle and said coating are not the same material and wherein said monocarboxylic acid in (b) is an unbranched C12-C22 monocarboxylic acid such as lauric acid, myristic acid, palmitic acid, stearic acid, oleic acid, linoleic acid or linolenic acid.

In the composition of the invention said polyol in (b) has preferably between 3 and 15 hydroxyl groups. A polyol in (b) may in some preferred embodiments have a total of not more than 10 carbon atoms. Particularly preferred polyols in (b) are selected from glycerol, diglycerol, polyglycerol, TMP, pentaerythritol and dipentaerythritol, di-TMP and Tris-2-hydroxyethyl Isocyanurate (THEIC).

Furthermore, said optionally substituted ester may be a partial or a full ester. Surprisingly, it was found that the rheological properties of polymers comprising coated core particles of the invention could be much better preserved when using only partial esters as coating material. This is evident from the examples provided herein below. Thus, most preferably said optionally substituted ester is a partial ester. If the ester is a partial ester it preferably has a hydroxyl number of between 50 and 250 and/or comprises at least one free hydroxyl group.

In a composition according to the invention the ratio by weight of core particle to coating is preferably between 500:1 and 5:1 and most preferably between 200:1 and 10:1.

In preferred embodiments, the composition of the invention comprises the following components:
  (a) a core particle which is a filler or pigment (preferably an inorganic filler or pigment); and
  (b) a coating that surrounds said core particle; wherein the coating comprises an optionally substituted ester of a polyol and a saturated or unsaturated monocarboxylic acid;
wherein said core particle and said coating are not the same material and wherein the core particle has an average particle size $d_{50}$ of less than 500 µm; and
wherein the ester is based on any of the following monocarboxylic acids and polyols listed for each embodiment in the following table:

| Embodiment | Monocarboxylic acid | Polyol |
|---|---|---|
| 1a | $C_8$-$C_{26}$ monocarboxylic acid | Polyol having between 3 and 15 hydroxyl groups |
| 1b | $C_8$-$C_{26}$ monocarboxylic acid | Polyol having between 3 and 4 hydroxyl groups |
| 1c | $C_{16}$-$C_{22}$ monocarboxylic acid | Polyol having between 3 and 15 hydroxyl groups |
| 1d | $C_{16}$-$C_{22}$ monocarboxylic acid | Polyol having between 3 and 4 hydroxyl groups |
| 1e | $C_{18}$-$C_{20}$ monocarboxylic acid | Polyol having between 3 and 15 hydroxyl groups |
| 1f | $C_{18}$-$C_{20}$ monocarboxylic acid | Polyol having between 3 and 4 hydroxyl groups |
| 1g | $C_8$-$C_{26}$ monocarboxylic acid | Polyol having between 3 and 15 hydroxyl groups and having not more than 10 carbon atoms |
| 1h | $C_8$-$C_{26}$ monocarboxylic acid | Polyol having between 3 and 4 hydroxyl groups and having not more than 10 carbon atoms |
| 1i | $C_{16}$-$C_{22}$ monocarboxylic acid | Polyol having between 3 and 15 hydroxyl groups and having not more than 10 carbon atoms |
| 1j | $C_{16}$-$C_{22}$ monocarboxylic acid | Polyol having between 3 and 4 hydroxyl groups and having not more than 10 carbon atoms |
| 1k | $C_{18}$-$C_{20}$ monocarboxylic acid | Polyol having between 3 and 15 hydroxyl groups and having not more than 10 carbon atoms |
| 1l | $C_{18}$-$C_{20}$ monocarboxylic acid | Polyol having between 3 and 4 hydroxyl groups and having not more than 10 carbon atoms |

In further preferred embodiments, the composition of the invention comprises the following components:
  (a) a core particle which is a filler or pigment (preferably an inorganic filler or pigment); and
  (b) a coating that surrounds said core particle; wherein the coating comprises an optionally substituted partial ester of a polyol and a saturated or unsaturated monocarboxylic acid;
wherein said core particle and said coating are not the same material and wherein the core particle has an average particle size d50 of less than 500 µm; and
wherein the ester is based on any of the following monocarboxylic acids and polyols listed for each embodiment in the following table:

| Embodiment | Monocarboxylic acid | Polyol |
|---|---|---|
| 2a | $C_8$-$C_{26}$ monocarboxylic acid | Polyol having between 3 and 15 hydroxyl groups |
| 2b | $C_8$-$C_{26}$ monocarboxylic acid | Polyol having between 3 and 4 hydroxyl groups |
| 2c | $C_{16}$-$C_{22}$ monocarboxylic acid | Polyol having between 3 and 15 hydroxyl groups |
| 2d | $C_{16}$-$C_{22}$ monocarboxylic acid | Polyol having between 3 and 4 hydroxyl groups |
| 2e | $C_{18}$-$C_{20}$ monocarboxylic acid | Polyol having between 3 and 15 hydroxyl groups |
| 2f | $C_{18}$-$C_{20}$ monocarboxylic acid | Polyol having between 3 and 4 hydroxyl groups |

-continued

| Embodiment | Monocarboxylic acid | Polyol |
|---|---|---|
| 2g | $C_8$-$C_{26}$ monocarboxylic acid | Polyol having between 3 and 15 hydroxyl groups and having not more than 10 carbon atoms |
| 2h | $C_8$-$C_{26}$ monocarboxylic acid | Polyol having between 3 and 4 hydroxyl groups and having not more than 10 carbon atoms |
| 2i | $C_{16}$-$C_{22}$ monocarboxylic acid | Polyol having between 3 and 15 hydroxyl groups and having not more than 10 carbon atoms |
| 2j | $C_{16}$-$C_{22}$ monocarboxylic acid | Polyol having between 3 and 4 hydroxyl groups and having not more than 10 carbon atoms |
| 2k | $C_{18}$-$C_{20}$ monocarboxylic acid | Polyol having between 3 and 15 hydroxyl groups and having not more than 10 carbon atoms |
| 2l | $C_{18}$-$C_{20}$ monocarboxylic acid | Polyol having between 3 and 4 hydroxyl groups and having not more than 10 carbon atoms |

As mentioned above, the composition of the invention provides at least partially coated core particles which are easier to disperse in a polymer and also are less prone to flocculate. Thus, the composition of the invention can be used as filler or pigment additive in polymer compositions.

Thus, in a further aspect, the invention provides a thermoplastic polymer composition comprising a thermoplastic polymer and a composition according to the invention.

To obtain a thermoplastic polymer composition of the invention comprising a coated filler or pigment composition the average skilled person can use the methods disclosed herein below in the example section.

The thermoplastic polymer in the thermoplastic polymer composition of the invention is preferably selected from the group consisting of polyethylene, PET, PC, ABS, polyamide, TPU, TPE, polystyrene and a polyolefin, preferably a halogenated polyolefin such as polyvinyl chloride. The thermoplastic polymer in said thermoplastic polymer composition can be a halogen-containing polymer e.g. polymers of vinyl chloride, vinyl resins containing vinyl chloride units in the polymer backbone, copolymers of vinyl chloride and vinyl esters of aliphatic acids, especially vinyl acetate, copolymers of vinyl chloride with esters of acrylic and methacrylic acid or acrylonitrile or mixtures of two or more thereof, copolymers of vinyl chloride with diene compounds or unsaturated dicarboxylic acids or anhydrides thereof, for example copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and other compounds such as acrolein, crotonaldehyde, vinyl methyl ketone, vinyl methyl ether, vinyl isobutyl ether and the like, polymers and copolymers of vinylidene chloride with vinyl chloride and other polymerisable compounds, such as those already mentioned above, polymers of vinyl chloroacetate and dichlorodivinyl ether, chlorinated polymers of vinyl acetate, chlorinated polymeric esters of acrylic acid and et-substituted acrylic acids, chlorinated polystyrenes, for example polydichlorostyrene, chlorinated polymers of ethylene, polymers and post-chlorinated polymers of chlorobutadiene and copolymers thereof with vinyl chloride and also mixtures of two or more of the mentioned polymers or polymer mixtures that contain one or more of the above-mentioned polymers.

The aforementioned thermoplastic polymers can also be combined in preferred embodiments of the thermoplastic polymer composition of the invention with a composition of the invention that comprises the following components:
(a) a core particle which is a filler or pigment (preferably an inorganic filler or pigment); and
(b) a coating that surrounds said core particle; wherein the coating comprises an optionally substituted partial ester of a polyol and a saturated or unsaturated monocarboxylic acid;
wherein said core particle and said coating are not the same material and wherein the core particle has an average particle size of $d_{50}$ of less than 500 μm; and
wherein the ester is based on the following monocarboxylic acids and polyols listed for each embodiment in the following table:

| Embodiment | Monocarboxylic acid | Polyol |
|---|---|---|
| 3a | $C_8$-$C_{26}$ monocarboxylic acid | Polyol having between 3 and 15 hydroxyl groups |
| 3b | $C_8$-$C_{26}$ monocarboxylic acid | Polyol having between 3 and 4 hydroxyl groups |
| 3c | $C_{16}$-$C_{22}$ monocarboxylic acid | Polyol having between 3 and 15 hydroxyl groups |
| 3d | $C_{16}$-$C_{22}$ monocarboxylic acid | Polyol having between 3 and 4 hydroxyl groups |
| 3e | $C_{18}$-$C_{20}$ monocarboxylic acid | Polyol having between 3 and 15 hydroxyl groups |
| 3f | $C_{18}$-$C_{20}$ monocarboxylic acid | Polyol having between 3 and 4 hydroxyl groups |
| 3g | $C_8$-$C_{26}$ monocarboxylic acid | Polyol having between 3 and 15 hydroxyl groups and having not more than 10 carbon atoms |
| 3h | $C_8$-$C_{26}$ monocarboxylic acid | Polyol having between 3 and 4 hydroxyl groups and having not more than 10 carbon atoms |
| 3i | $C_{16}$-$C_{22}$ monocarboxylic acid | Polyol having between 3 and 15 hydroxyl groups and having not more than 10 carbon atoms |
| 3j | $C_{16}$-$C_{22}$ monocarboxylic acid | Polyol having between 3 and 4 hydroxyl groups and having not more than 10 carbon atoms |
| 3k | $C_{18}$-$C_{20}$ monocarboxylic acid | Polyol having between 3 and 15 hydroxyl groups and having not more than 10 carbon atoms |
| 3l | $C_{18}$-$C_{20}$ monocarboxylic acid | Polyol having between 3 and 4 hydroxyl groups and having not more than 10 carbon atoms |

Within the scope of a preferred embodiment of the present invention, the thermoplastic polymer composition according to the invention is used for the production of molded, extruded and/or calendered articles, such as window profiles, industrial profiles, tubes, plates, e.t.c. Said molded article is preferably an injection-molded article.

The thermoplastic polymer composition according to the invention may optionally also comprise additional ingredients selected from the group consisting of cure agents, lubricants, ultraviolet light stabilizers, antioxidants, catalyst stabilizers, flame retardants, antiblock agents, metal soaps and combinations thereof.

Preferably, in the composition of the invention, the core particle is coated with an amount of at least 5, 6, 7, 8, 9, 10, 15, 20, 25, 30, 35, 40, 45 or at least 50 wt % ester based on the total weight of components (a) and (b), i.e. based on the total weight of the core particles and ester.

In the thermoplastic polymer composition according to the invention it is preferable if the coated core particle composition of the invention is between 0.1 wt % and 80 wt % based on the weight of the total thermoplastic polymer composition of the invention and preferably between 5 and 40 wt % on the weight of the total thermoplastic polymer composition of the invention.

In a further aspect the invention relates to a molded, calendered or extruded article comprising a thermoplastic polymer composition according to the invention. The average skilled person can for example use the following method according to the next aspect of the invention for producing said molded or extruded articles. This method comprises the steps:
I) providing a thermoplastic polymer composition according to the invention;
II) heating the composition to at least 5° C. below the glass transition temperature of the thermoplastic polymer or to a temperature above the glass transition temperature of the thermoplastic polymer;
III) producing a molded, calendered or extruded article from the heated composition.

In one embodiment of this method the composition according to the invention is heated and mixed in a first step at about 120° C. and then melted in step II to produce a mass suitable for extrusion and/or the preparation of a molded article. Depending on the thermoplastic polymer the temperatures used can be optimized to minimize thermal decomposition of the polymer. For example in a preferred embodiment of the method of the invention, in step (II) a temperature between 1° C. below the glass transition temperature of the polymer and 25° C. above the glass temperature of the thermoplastic polymer is applied.

Also provided in a further aspect is a method for producing a coated core particle composition according to the invention comprising the steps:
(i) providing a core particle of the invention;
(ii) providing said optionally substituted ester of the invention in liquid form;
(iii) coating said core particle with said optionally substituted ester by mixing the ester with said core particle; and
(iv) optionally solidifying said ester coating by drying and/or cooling.

In the above method it is preferred in one embodiment that the core particles and the ester are heated independently (the core particles being preferably heated to a higher temperature than the ester) and the core particles and ester is subsequently mixed in a separate step. Mixing of the core particles and the ester can be performed in a conventional mixing device comprising a stirrer or in an extruder.

Core particles of a particular density are particularly prone to aggregation and flocculation. Thus, the core particles used in the invention have preferably a bulk density of at least 0.5 kg/m'. More preferably the bulk density is between 0.5 and 7000 kg/m$^3$ and most preferably between 0.6 and 4500 kg/m$^3$ measured according to DIN ISO 697: 1984-01.

As aforementioned the composition of the invention has improved dispersion qualities and good pourability. In this context it is to be understood that as used throughout this specification the pourability of a substance is determined as defined in the standard method A disclosed in the August 1998 edition of TSO 6186. In this method a funnel is used to determine the pourability of powdered and granular plastics. This method is also used to determine the pourability of coated core particles of the invention. The average skilled person is familiar with the method outlined in ISO 6186 and able to carry out this method.

In light of the improved pourability, a further aspect of the invention concerns the use of a composition according to the invention as filler or pigment in a thermoplastic polymer, wherein the thermoplastic polymer is preferably as defined herein.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be covered by the present invention.

The following examples are merely illustrative of the present invention and should not be construed to limit the scope of the invention as indicated by the appended claims in any way.

EXAMPLES

Example 1: Production of Coated Chalk

Chalk (Kreide Industrie spezial, Fa. Omya GmbH, bulk density of 0.62 kg/m$^3$ according to DIN ISO 697:1984-01) was submitted into a mixing device and combined with the ester. This mixture was stirred until a temperature of 70° C. was reached. Prior to further use the mixture was allowed to cool down.

| Mixture | Ester | Hydroxyl number (OHZ) of ester | Amount of ester (grams) | Amount of chalk (grams) |
|---|---|---|---|---|
| 1.1 | Pentaerythrityl-distearate | 151 | 22.7 | 227.3 |
| 1.2 | Pentaerythrityl-tetrastearate | 24.4 | 22.7 | 227.3 |
| 1.3 | Glycerolmonooleate | 226 | 22.7 | 227.3 |

Example 2: Determination of Pourability According to DIN EN ISO 6186

The pourability of both coated and uncoated chalk samples was analyzed using a funnel according to DIN EN ISO 6186.

| | Diameter of funnel outlet (mm) | | |
|---|---|---|---|
| Sample | 10 | 15 | 20 |
| Non-coated chalk | Does not flow | Does not flow | Does not flow |
| Mixture 1.1 | Does not flow | Flows | Flows |
| Mixture 1.2 | Does not flow | Flows | Flows |
| Mixture 1.3 | Does not flow | Flows | Flows |

As shown, the inventive esters improved the pourability of the core particles (in this example: chalk).

Example 3: Production of Dryblends

From PVC-powder and different additives a dry-blend was produced in a mixing device of the company Henschel (amount of material=3 kg, heating temperature=120° C., subsequently cooling). The compositions are shown in the following table:

| Example | B1 | B2 | B3 | B4 |
|---|---|---|---|---|
| PVC Evipol SH 6630 | 100 | 100 | 100 | 100 |
| Stabilox CZ 2913 GN | 3.85 | 3.85 | 3.85 | 3.85 |
| Loxiol 2899 | 0.2 | 0.2 | 0.2 | 0.2 |
| Non-coated chalk | 30 | — | — | — |
| Mixture 1.1 | — | 30 | — | — |
| Mixture 1.2 | — | — | 30 | — |
| Mixture 1.3 | — | — | — | 30 |

All amounts shown in the above table are given in parts per hundred resin (phr).

PVC Evipol SH 6630 obtainable e.g. from Ineos is PVC having a k-value of 66.

Stabilox CZ 2913 GN is a Ca/Zn stabiliser of the company Reagens.

Loxiol 2899 is an ester lubricant of Emery Oleochemicals with a dropping point of 75-80° C. as measured using DIN ISO 2176:1995.

Example 4: Production of Flat Ribbons

The dry-blends were extruded on a dual screw extruder of the company Weber into a flat ribbon (parameters of extrusion: rotational speed=15 rpm (B2-B4), temperature=180° C.). As a measure for the degree of lubrication the power consumption of the extruder, the machine load (in %) and the melt pressure was analyzed.

| Example | machine load (%) | melt pressure (bar) |
|---|---|---|
| B1 | 64.4 | 400 |
| B2 | 30.1 | 187 |
| B3 | 21.1 | 103 |
| B4 | 44.6 | 265 |

As mentioned, the inventive esters improved the pourability of the core particles (in this example: chalk). Surprisingly, when using partial esters as coating agents (examples B2 and B4), then the rheology of the final product, i.e. the dry blend was not significantly affected while when using full-esters (example B3), the machine load and melt pressure was notably reduced such that the resultant extruded material was excessively lubricated which may occasionally result in a tendency to produce a less exact shape of the extruded product.

The invention claimed is:

1. A composition comprising:
   (a) a core particle; and
   (b) a coating that at least partially surrounds said core particle and that comprises an optionally substituted ester of a polyol and a saturated or unsaturated monocarboxylic acid wherein the core particle is coated with said coating;
   wherein said core particle and said coating are not the same material and wherein said core particle has an average particle size $d_{50}$ of between 1 and 500 μm.

2. The composition of claim 1, wherein said core particle is a filler or a pigment.

3. The composition according to claim 1, wherein said core particle is filamentous, spherical, cylindrical, cubic, platy, acicular, discoidal, tabular, ellipsoidal, or equant.

4. The composition according to claim 1, wherein said core particle has an average particle size $d_{50}$ of between 3 and 100 μm.

5. The composition according to claim 1, wherein said core particle is at least partially crystalline.

6. The composition according to claim 2, wherein said filler is a compound selected from the list consisting of calcium carbonate, dolomite, kaolinite, carbon, zeolite, graphite, mica, borosilicate, silicon dioxide, cellulose, silicic acid, aluminium hydroxide, magnesium hydroxide, magnesium oxide, zinc oxide and calcium oxide, chalk, kaolin, quartz powder, baryte, a metal powder, hydrated alumina, cement, talc, diatomaceous earth, sawdust, wood chips and a mixture of at least two of these fillers.

7. The composition according to claim 2, wherein said pigment is selected from the list consisting of a cadmium pigment, a carbon pigment, a chromium pigment, a cobalt pigment, a copper pigment, an iron oxide pigment, a lead pigment, a mercury pigment, a titanium pigment, a zinc pigment, or a mixture of at least two of these pigments.

8. The composition according to claim 1, wherein said monocarboxylic acid in (b) is selected from the group consisting of
   a branched saturated $C_8$-$C_{36}$ monocarboxylic acid,
   an unbranched saturated $C_8$-$C_{36}$ monocarboxylic acid,
   a branched unsaturated $C_8$-$C_{36}$ monocarboxylic acid and
   an unbranched unsaturated $C_8$-$C_{36}$ monocarboxylic acid.

9. The composition according to claim 1, wherein said polyol in (b) has between 3 and 15 hydroxyl groups and is selected from glycerol, diglycerol, polyglycerol, trimethylolpropane, pentaerythritol and dipentaerythritol, di-trimethylolpropane and Tris-2-hydroxyethyl Isocyanurate (THEIC).

10. The composition according to claim 1, wherein said ester is a partial ester.

11. The composition according to claim 1, wherein the ratio by weight of said core particle to said coating is between 500:1 and 5:1.

12. The composition according to claim 1, wherein the monocarboxylic acid in (b) is an unbranched $C_{12}$-$C_{22}$ monocarboxylic acid selected from lauric acid, myristic acid, palmitic acid, stearic acid, oleic acid, linoleic acid or linolenic acid.

13. The composition according to claim 1, wherein the ratio by weight of said core particle to said coating is between 200:1 and 10:1.

14. The composition according to claim 1, wherein the coating b) is selected from pentaerythrityl-distearate, pentaerythrityl-tetrastearate, or glycerolmonooleate.

15. The composition according to claim 1, wherein the core particle a) is chalk.

16. The composition according to claim 1, wherein said ester has a hydroxyl number of between 50 to 300.

17. The composition according to claim 1, wherein said ester has a hydroxyl number of less than 30.

* * * * *